(12) United States Patent
Chigurupati et al.

(10) Patent No.: US 8,467,383 B2
(45) Date of Patent: Jun. 18, 2013

(54) STATEFUL SWITCHING BETWEEN RELIABLE TRANSPORT MODULES FOR COMMUNICATING WITH AN EXTERNAL PEER WITHOUT LOSING THE TRANSPORT LAYER CONNECTION

(75) Inventors: Chakravarthi S. Chigurupati, San Jose, CA (US); Tejas H. Rajkotia, San Jose, CA (US); Bharat M. Bhojwani, Fremont, CA (US); Pradeep Singh, San Jose, CA (US); Dongling Duan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1490 days.

(21) Appl. No.: 11/805,533

(22) Filed: May 23, 2007

(65) Prior Publication Data

US 2008/0291906 A1     Nov. 27, 2008

(51) Int. Cl.
*H04L 12/66*     (2006.01)
(52) U.S. Cl.
USPC ............................................................ 370/356
(58) Field of Classification Search
None
See application file for complete search history.

(56) References Cited

U.S. PATENT DOCUMENTS

| 6,853,617 | B2 | 2/2005 | Watson et al. |
| 7,406,037 | B2 * | 7/2008 | Okita ............................ 370/218 |
| 7,424,014 | B2 | 9/2008 | Mattes et al. |
| 2002/0167952 | A1 * | 11/2002 | Watson et al. ................ 370/401 |
| 2003/0056138 | A1 * | 3/2003 | Ren ................................... 714/4 |
| 2003/0223466 | A1 * | 12/2003 | Noronha et al. .............. 370/537 |
| 2005/0226144 | A1 * | 10/2005 | Okita ............................ 370/219 |
| 2006/0062142 | A1 | 3/2006 | Appanna et al. |
| 2006/0262716 | A1 | 11/2006 | Ramaiah et al. |
| 2006/0262734 | A1 | 11/2006 | Appanna et al. |
| 2007/0195773 | A1 | 8/2007 | Tatar et al. |

* cited by examiner

*Primary Examiner* — Minh-Trang Nguyen
(74) *Attorney, Agent, or Firm* — The Law Office of Kirk D. Williams

(57) ABSTRACT

Disclosed are, inter alia, methods, apparatus, and means for stateful switching between reliable transport modules for communicating with an external peer without losing the transport layer connection. Primary and standby reliable transport protocol modules each maintain state concerning the reliable transport connection (e.g., data, segmentation, acknowledgements) such that if the primary or standby reliable transport protocol module fails, the other can resume by itself such that the communication with the peer transport application does not need to be restarted. Also, by the communications subsystem of a device providing copies of received reliable transport protocol messages directly to both the primary and standby reliable transport protocol modules, upon failover, the communications subsystem does not need to be reconfigured for resuming operations as, for example, the standby reliable transport protocol module will already be receiving these packets.

24 Claims, 9 Drawing Sheets

STATEFUL SWITCHING BETWEEN RELIABLE TRANSPORT MODULES FOR COMMUNICATING WITH AN EXTERNAL PEER WITHOUT LOSING THE TRANSPORT LAYER CONNECTION

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Routing protocols such as Border Gateway Protocol (BGP) and Label Distribution Protocol (LDP) use Transmission Control Protocol (TCP) for reliable transport layer communication with their peers. Currently, if fail-over occurs in a router processor running one of these protocols, the TCP sessions go down and cause a re-convergence of routing protocols. This re-convergence is expensive in terms of computation needs and potential black-holing of traffic. Graceful restart extensions of the routing protocols can be deployed but they have their own problems.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
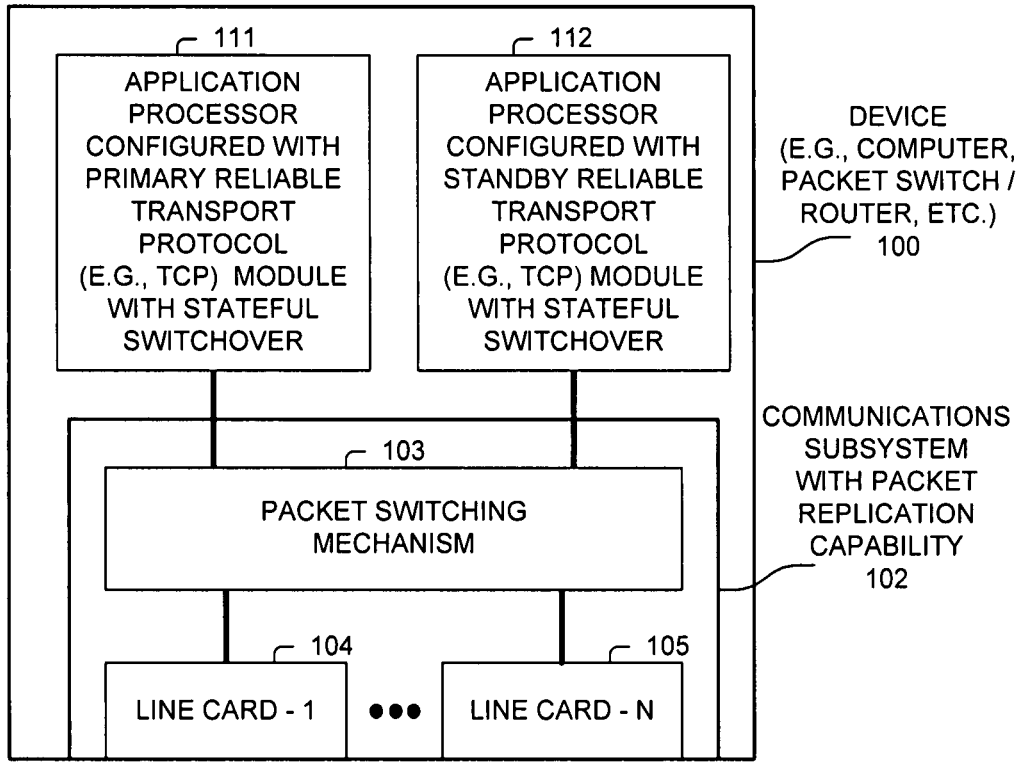
FIGS. 1A, 1B, 1C illustrate examples of one or more devices useful for explaining the operation of one embodiment.

Disclosed are, inter alia, methods, apparatus, and means for stateful switching between reliable transport modules for communicating with an external peer without losing the transport layer connection.

An apparatus includes one embodiment, with this embodiment comprising: a primary reliable transport module, a standby reliable transport module, and a communications subsystem. The primary reliable transport protocol module is configured: (a) to be the active reliable transport protocol module in a normal transport module operating state, and (b) not to be the active reliable transport protocol module in a failover transport module operating state. The standby reliable transport protocol module is configured: (a) not to be the active reliable transport protocol module in the normal transport module operating state, and (b) to be the active reliable transport protocol module in the failover transport module operating state. The communications subsystem is configured to communicate packets with one or more external devices, including delivering individual copies of reliable transport protocol module packets received over a connection with a peer transport application in one of said external devices to both the primary and standby reliable transport protocol modules while in the normal transport module operating state. wherein said individual copies of said received reliable transport protocol module packets being delivered to the primary reliable transport protocol module do not flow through the standby reliable transport module, and wherein said individual copies of received reliable transport protocol module packets being delivered to the standby reliable transport protocol module do not flow through the primary reliable transport module. The connection with the peer transport application does not need to be restarted when a switch is made from the normal transport module operating state to the failover transport module operating state and the standby reliable transport protocol module takes over as the active reliable transport protocol module from the primary reliable transport module.

2. Description

Disclosed are, inter alia, methods, apparatus, and means for stateful switching between reliable transport modules for communicating with an external peer without losing the transport layer connection.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, and means for stateful switching between reliable transport modules for communicating with an external peer transport application without losing the transport layer connection. This is typically accomplished using a primary reliable transport module and one or more standby reliable transport modules that each maintain the state of the transport layer connection to peer transport application, such that if one fails, another reliable transport module can take over without losing (e.g., having to restart) the transport layer connection with the external peer transport application. One embodiment includes two or more standby reliable transport module which would be easily practiced by one skilled in the art based on the extensible description provided herein. The switching among primary and standby reliable transport modules can be performed in response to a manual command, or automatically in response to the detection of an error or failure.

An apparatus includes one embodiment, with this embodiment comprising: a primary reliable transport module, a standby reliable transport module, and a communications subsystem. The primary reliable transport protocol module is configured: (a) to be the active reliable transport protocol module in a normal transport module operating state, and (b) not to be the active reliable transport protocol module in a failover transport module operating state. The standby reliable transport protocol module is configured: (a) not to be the active reliable transport protocol module in the normal transport module operating state, and (b) to be the active reliable transport protocol module in the failover transport module operating state. The communications subsystem is configured to communicate packets with one or more external devices, including delivering individual copies of received reliable transport protocol module packets to both the primary and standby reliable transport protocol modules while in the normal transport module operating state. The copies of received reliable transport protocol module packets that are sent to the primary reliable transport protocol module do not flow through the standby reliable transport module; and similarly, the copies of received reliable transport protocol module packets that are sent to the standby reliable transport protocol module do not flow through the primary reliable transport module. The primary or standby reliable transport protocol module currently acting as the active reliable transport protocol module is configured to communicate with a peer external to the apparatus. The primary and standby reliable transport protocol modules are each configured to maintain state of the active reliable transport protocol module such that the communication with the peer does not need to be restarted when a switch is made from the normal transport module operating state to the failover transport module operating state wherein the standby reliable transport protocol module takes over as the active reliable transport protocol module from the primary reliable transport module.

In one embodiment, the communications subsystem is configured to maintain the same routing of the reliable transport protocol module packets by the communications subsystem to both the primary and standby reliable transport modules when the apparatus is in the normal transport module operating state and in the failover transport module operating state. In one embodiment, the communications subsystem is configured to continue to deliver individual copies of received reliable transport protocol module packets to both the primary and standby reliable transport protocol modules at least until the standby reliable transport protocol module acts as the active reliable transport protocol module in switching from the normal transport module operating state to failover transport module operating state.

In one embodiment, while in the normal transport module operating state, the primary reliable transport protocol module communicates information to be sent to the peer transport application to the standby reliable transport module, and in response, the standby reliable transport protocol module sends this said information to the peer transport application. In one embodiment, the primary reliable transport protocol module is configured to provide data segmenting instructions to the standby reliable transport protocol module for information being sent to the peer transport application; and the standby reliable transport protocol module is configured to send said information to the peer transport application according to said provided data segmenting instructions.

One embodiment includes primary application and secondary application; wherein the apparatus is configured to communicate information between the primary application and the peer transport application using the primary reliable transport protocol module in the normal transport module operating state and between the secondary application and the peer transport application using the standby reliable transport protocol module in the failover transport module operating state. In one embodiment, the reliable transport protocol module packets are transmission control protocol (TCP) packets. In one embodiment, the primary application, the secondary application and the peer transport application each run border gateway protocol (BGP) or Label Distribution Protocol (LDP). In one embodiment, the apparatus corresponds to a packet switching device.

In one embodiment, while in the normal transport module operating state: acknowledgements of said received reliable transport protocol module packets are generated by the primary reliable transport protocol module and provided to the standby reliable transport module, and in response, the standby reliable transport module updates its state information and sends acknowledgements to the peer transport application covering said acknowledgments generated by the primary reliable transport protocol module.

One embodiment includes one or more first processors and first memory and one or more second processors and second memory; wherein the first memory stores one or more instructions that, when executed by said one or more first processors, perform steps for implementing the operations of the primary reliable transport module, and wherein the second memory stores one or more instructions that, when executed by said one or more second processors, perform steps for implementing the operations of the standby reliable transport module.

One embodiment includes a first application processor card and a second application processor card; wherein the first application processor card is configured to implement the primary reliable transport module; and wherein the second application processor card is configured to implement the standby reliable transport module. In one embodiment, while in the normal transport module operating state, the primary reliable transport protocol module communicates information to be sent to the peer transport application to the standby reliable transport module, and in response, the standby reliable transport protocol module sends this said information to the peer transport application. In one embodiment, the active primary reliable transport protocol module is configured to be the active reliable transport protocol module in a standby failure transport module operating state and to communicate with the peer transport application without sending information through the standby reliable transport module.

One embodiment is used by a device to communicate information with a peer external to the device. A packet is received from the peer transport application. Individual copies of the packet are provided to both a primary reliable transport protocol module and a standby reliable transport protocol module without routing either copy through the other of said reliable transport protocol module. In response to receiving one of said copies of the packet, the standby reliable transport protocol module: (a) communicating an indication of said receipt by the standby reliable transport protocol module to the primary reliable transport protocol module, and (b) providing information from said copy of the packet to a standby application; and in response to receiving the indication of said receipt by the standby reliable transport protocol module and having received one of said copies of the packet, the primary reliable transport protocol module: (a) sending an acknowledgement message corresponding to the packet to the peer transport application via the standby reliable transport protocol module, and (b) providing information from said copy of the packet to a primary application.

In one embodiment, in response to the primary reliable transport protocol module receiving data from the primary application to be sent to the peer transport application, the primary reliable transport protocol module providing said data and segmenting instructions to the standby reliable transport protocol module; and in response to receiving said data and said segmenting instructions, the standby reliable transport protocol module sending said data according to said segmenting instructions to the peer transport application. In one embodiment, the primary reliable transport protocol module generates acknowledgements for data received from the peer transportation application and informs the standby reliable transport protocol module of said acknowledgements; and in response, the standby reliable transport protocol module communicates acknowledgements to the peer transport application covering said acknowledgements generated by the primary reliable transport protocol module. In one embodiment, in response to changing to a failover transport module operating state, the standby reliable transport protocol module takes over as the active reliable transport protocol module and communicates with the peer transport application and the standby application without being a slave to the primary reliable transport protocol module.

An apparatus includes one embodiment configured to communicate information with a peer external to the apparatus. One embodiment includes: means for providing individual copies of the packet to both a primary reliable transport protocol module and a standby reliable transport protocol module without routing either copy through the other of said reliable transport protocol module; the standby reliable transport protocol module including (a) means for communicating an indication of said receipt by the standby reliable transport protocol module to the primary reliable transport protocol module, and (b) means for providing information from said copy of the packet to a standby application; and the primary reliable transport protocol module including (a) means for sending an acknowledgement message corresponding to the packet to the peer transport application via the standby reliable transport protocol module, and (b) means for providing information from said copy of the packet to a primary application. In one embodiment, the standby reliable transport protocol module comprises means for acting as the active reliable transport module, which includes means for communicating with the peer transport application and the standby application without being a slave to the primary reliable transport protocol module.

Turning expressly to the figures, FIG. 1A illustrates a device 100, such as, but not limited to a computer, packet switch (e.g., a router, bridge, etc.), etc., that includes on embodiment, or operates according to one embodiment. As shown, device 100 includes a first application processor 111 configured to include a primary reliable transport protocol module having stateful switchover capability, and a second application processor 112 configured to include a standby reliable transport protocol module having stateful switchover capability. The term stateful switchover capability refers to, inter alia, the maintaining of current state information of a reliable transport protocol connection with an external peer such that the switching of the acting active reliable transport protocol module from the primary reliable transport protocol module to the standby reliable transport protocol module can be performed without dropping the connection with the peer because, in this situation, the standby reliable transport protocol module has enough state information to continue the connection in an effective manner according to one embodiment.

Device 100 also includes communications subsystem 102 having packet replication capability for providing copies of received transport protocol packets to both the primary and standby reliable transport modules executing in application processors 111, 112. In the example shown, communications subsystem 102 includes a packet switching mechanism 103 which provides one or more communication paths among application processors 111 and 112, and multiple line cards 104-105, which are typically configured to send and receive packets with external devices. Packet switching mechanism 103 may be implemented in a number of different ways, such as, but not limited to, including a bus, packet switching fabric or other packet switching device for communicating packets between multiple points.

Figure 1B:
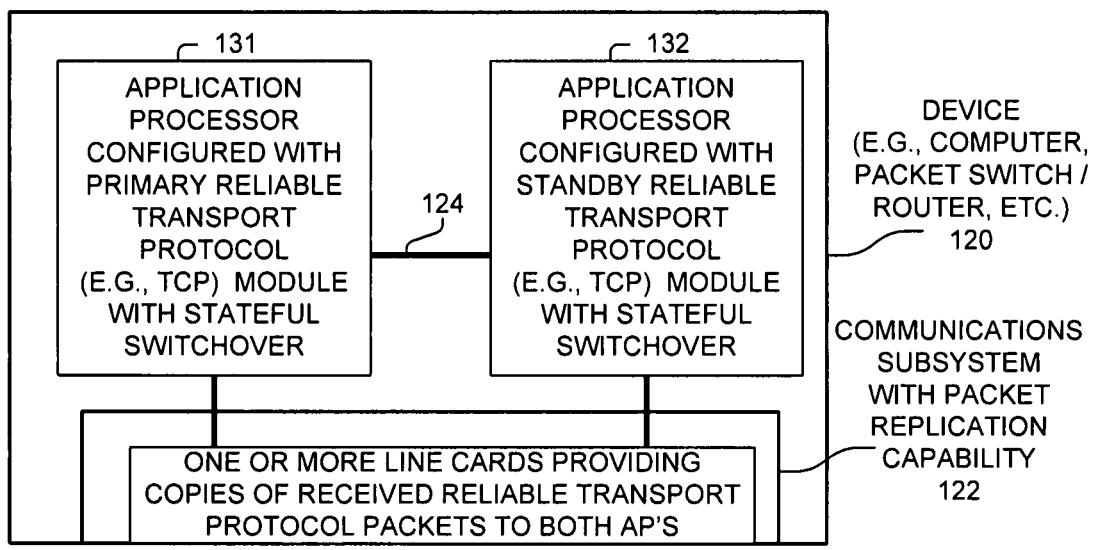

FIG. 1B illustrates device 120 which is configured in a slightly different manner than that of device 100 (FIG. 1A). As shown, device 120 includes: a first application processor 131 configured to include a primary reliable transport protocol module having stateful switchover capability; a second application processor 132 configured to include a standby reliable transport protocol module having stateful switchover capability, and communications subsystem 122 having packet replication capability for providing copies of received transport protocol packets to both the primary and standby reliable transport modules executing in application processors 131, 132. Also, illustrated is a communication path 124 which allows the active and standby reliable transport protocol modules to communicate information (e.g., state information required for stateful switchover).

Figure 1C:
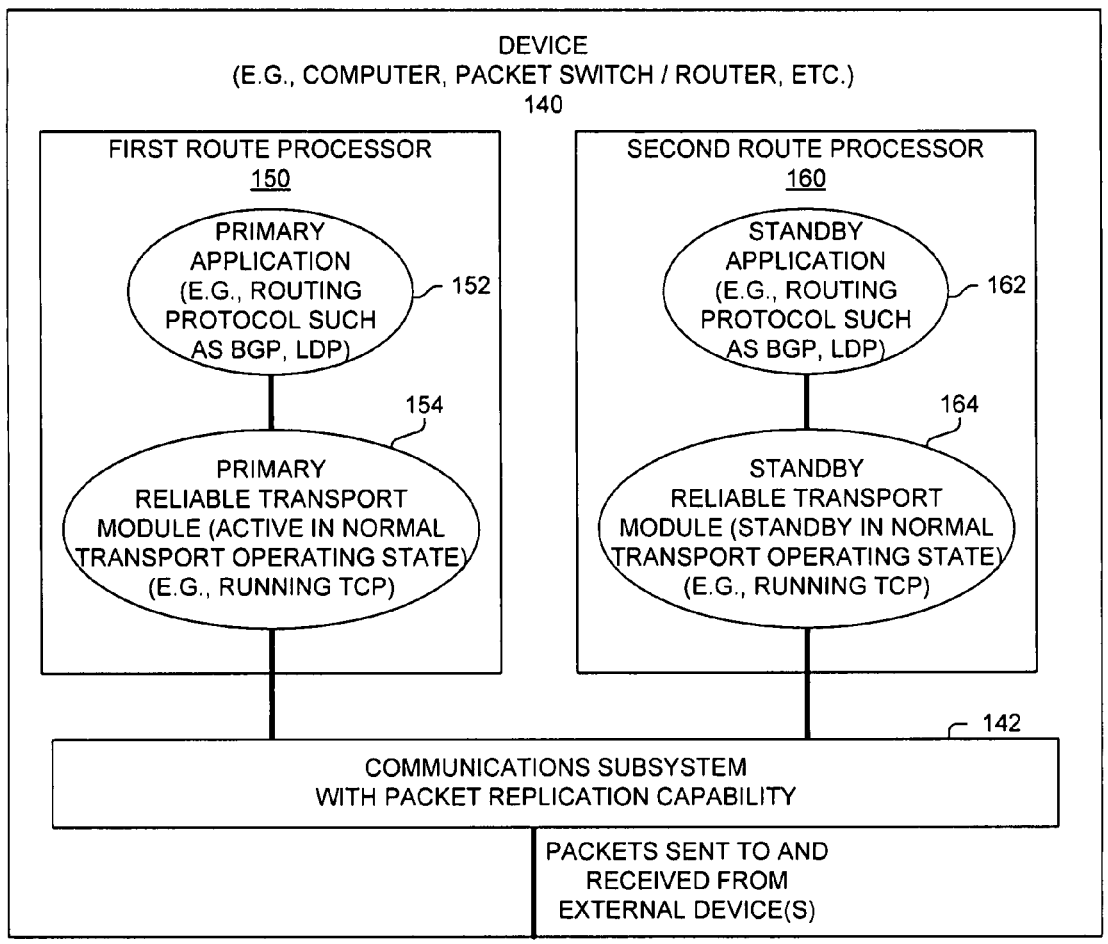

FIG. 1C illustrates another configuration of a device 140, which, as shown, includes first route processor 150 and second route processor 160. In this example, first route processor 150 includes primary application 152 (e.g., a stateful switchover version of routing protocol such as, but not limited to BGP or LDP) and primary reliable transport protocol module 154 running a stateful switchover version of a reliable transport protocol (e.g., TCP). Device 140 also includes second route processor 160 includes standby application 162 (e.g., a stateful switchover version of routing protocol such as, but not limited to BGP or LDP) and standby reliable transport protocol module 164 running a stateful switchover version of a reliable transport protocol (e.g., TCP). Device 140 also includes communications subsystem 142 configured to communicate with external devices, with communications subsystem 142 including a capability to provide copies of received reliable transport protocol packets to both primary and standby reliable transport modules 154, 164, at least during the normal transport operating state.

Figure 1D:
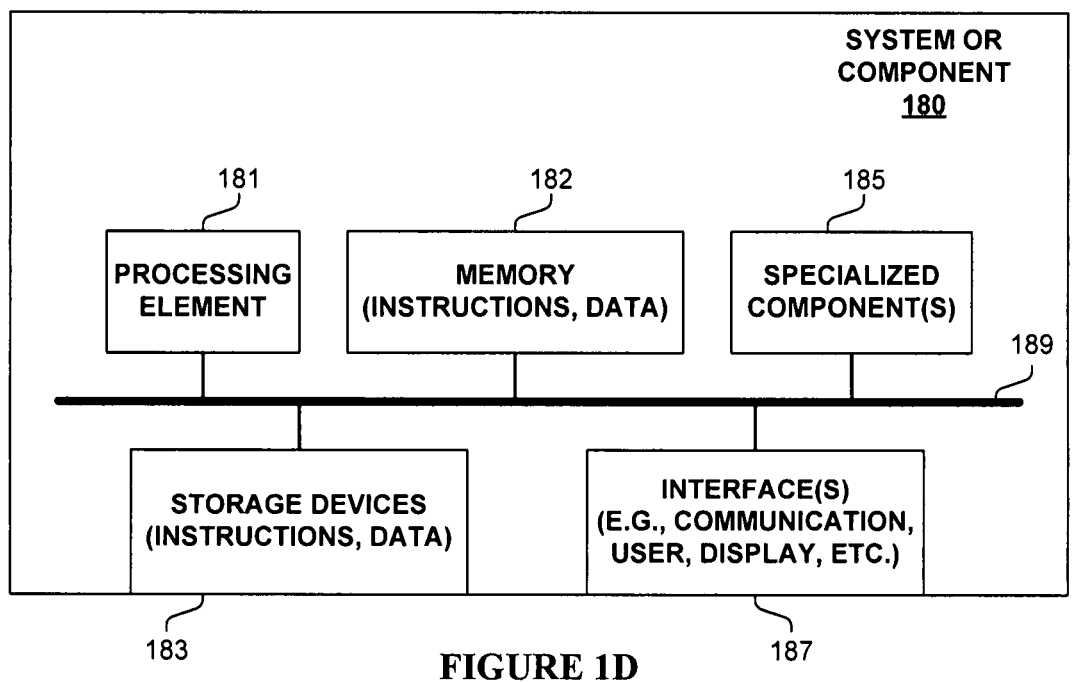
FIG. 1D illustrates an example system or component used in one embodiment.

FIG. 1D is block diagram of a system or component 180 used in one embodiment configured to provide stateful switchover between active and standby reliable transport protocol modules. In one embodiment, system or component 180 performs one or more processes corresponding to one of the diagrams illustrated or otherwise described herein, such as, but not limited to executing a primary and/or standby reliable transport protocol module and/or a primary and/or standby application.

In one embodiment, system or component 180 includes a processing element 181, memory 182, storage devices 183, specialized components 185 (e.g. optimized hardware such as for performing certain operations, etc.), and interfaces 187 for communicating information (e.g., sending and receiving packets, user-interfaces, displaying information, etc.), which are typically communicatively coupled via one or more communications mechanisms 189, with the communications paths typically tailored to meet the needs of the application.

Various embodiments of component 180 may include more or less elements. The operation of component 180 is typically controlled by processing element 181 using memory 182 and storage devices 183 to perform one or more tasks or processes. Memory 182 is one type of computer-readable medium, and typically comprises random access memory (RAM), read only memory (ROM), flash memory, integrated circuits, and/or other memory components. Memory 182 typically stores computer-executable instructions to be executed by processing element 181 and/or data which is manipulated by processing element 181 for implementing functionality in accordance with an embodiment. Storage devices 183 are another type of computer-readable medium, and typically comprise solid state storage media, disk drives, diskettes, networked services, tape drives, and other storage devices. Storage devices 183 typically store computer-executable instructions to be executed by processing element 181 and/or data which is manipulated by processing element 181 for implementing functionality in accordance with an embodiment.

Figure 2A:
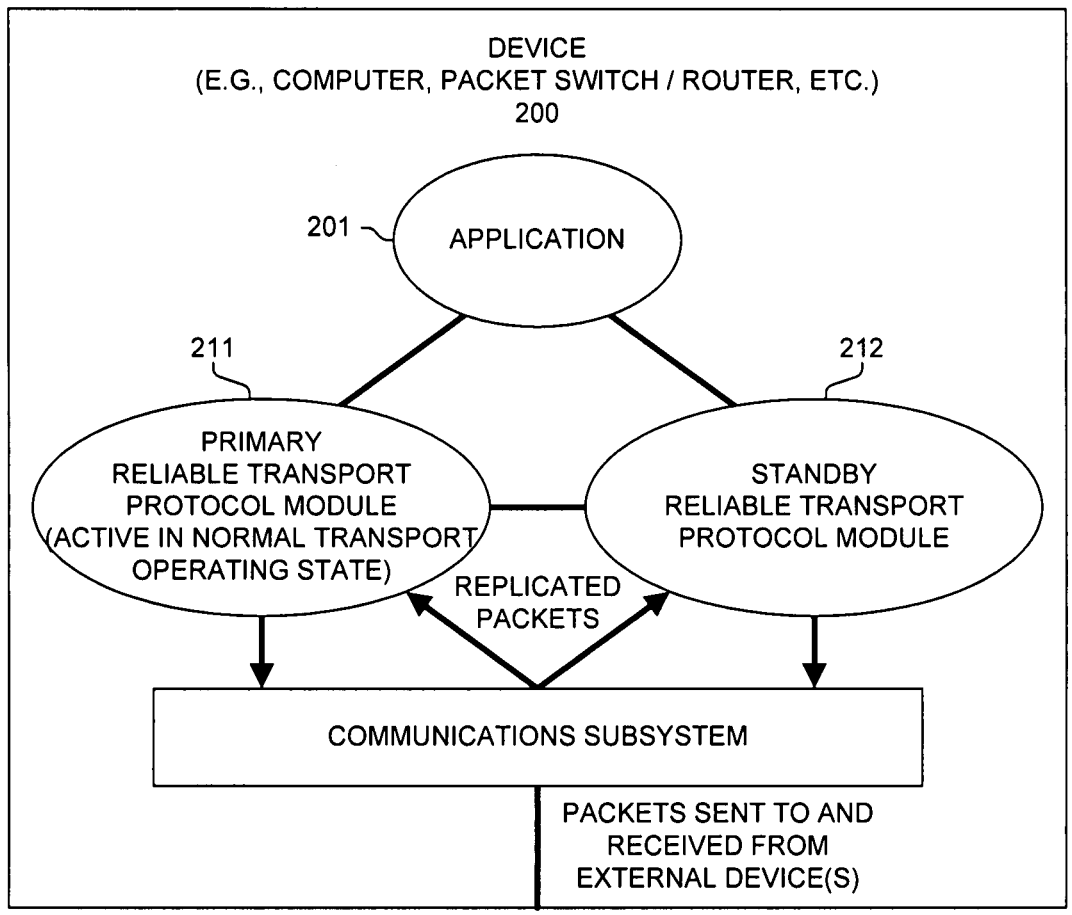
FIGS. 2A and 2B illustrate examples of one or more device useful for explaining the operation of one embodiment.

FIG. 2A is used to illustrate that device 200, including and/or operating according to one embodiment, may have a single application 201 relying on a primary reliable transport protocol module 211 and a standby reliable transport protocol module 212 to communicate with a peer of the application, with this peer being external to device 200. It is often desirable to have a first processing system running a primary application and a primary reliable transport protocol module and a second processing system running a standby application and a standby reliable transport protocol module with each of these maintaining state information for a quick failover, because if one processing system fails, then the other system can continue in a stateful manner.

Figure 2B:
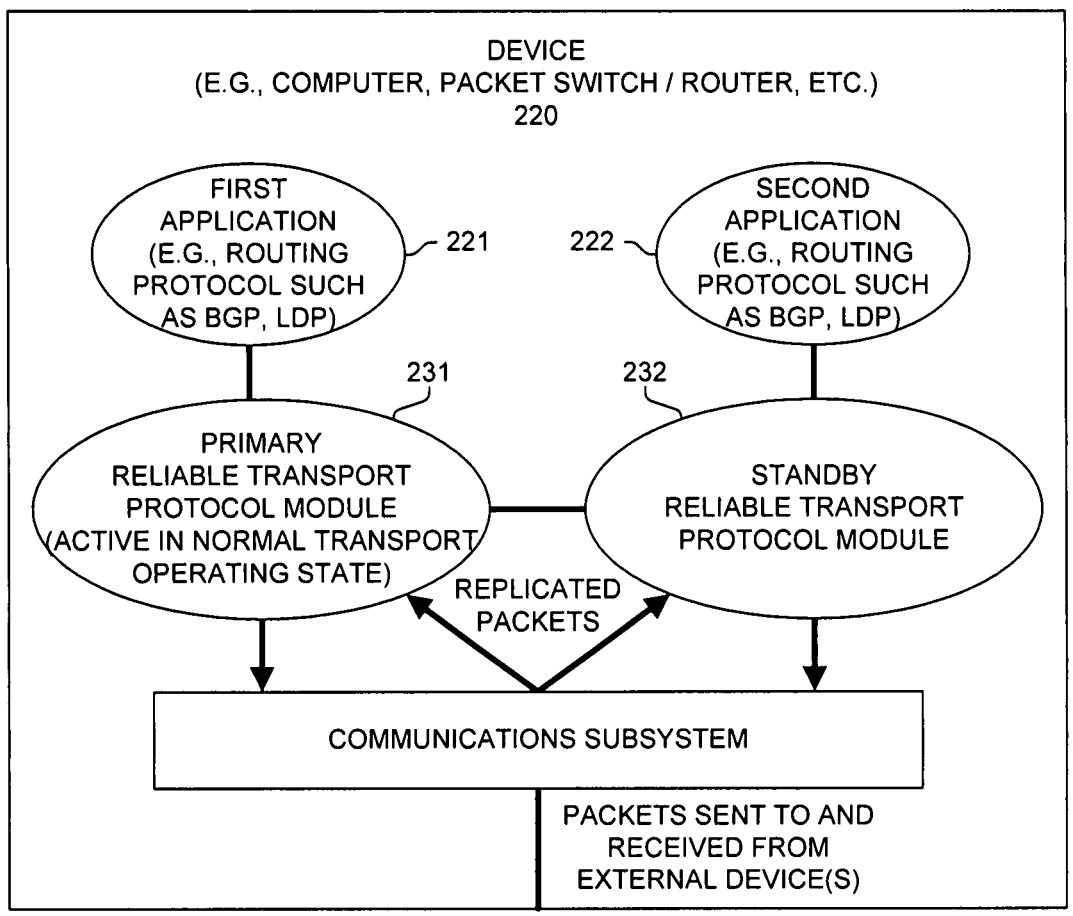

FIG. 2B is used to illustrate that device 220, including and/or operating according to one embodiment, may have a first application 221 relying on a primary reliable transport protocol module 231, and a second application 222 relying on a standby reliable transport protocol module 232 for communicating a peer of the applications, with this peer being external to device 200.

Figure 3A:
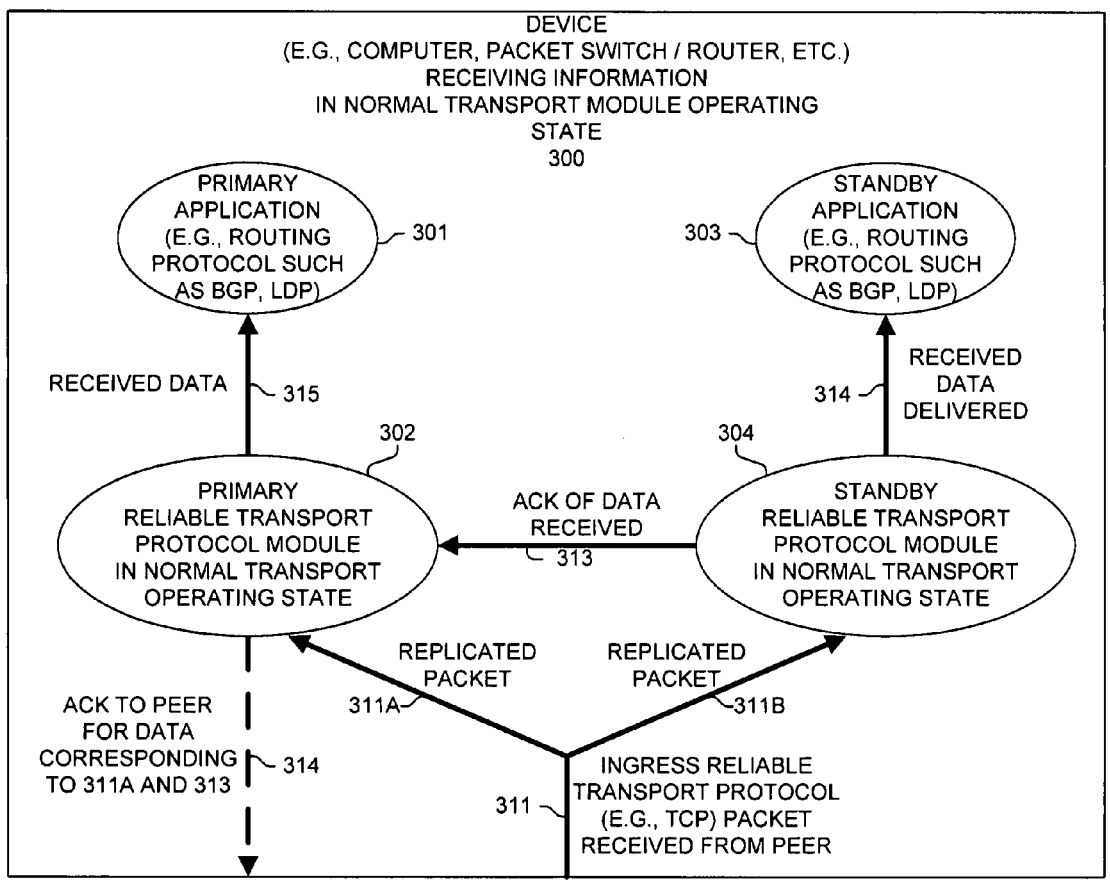
FIGS. 3A and 3B illustrate the operation of one embodiment operating in normal transport module operating state.
Figure 3B:
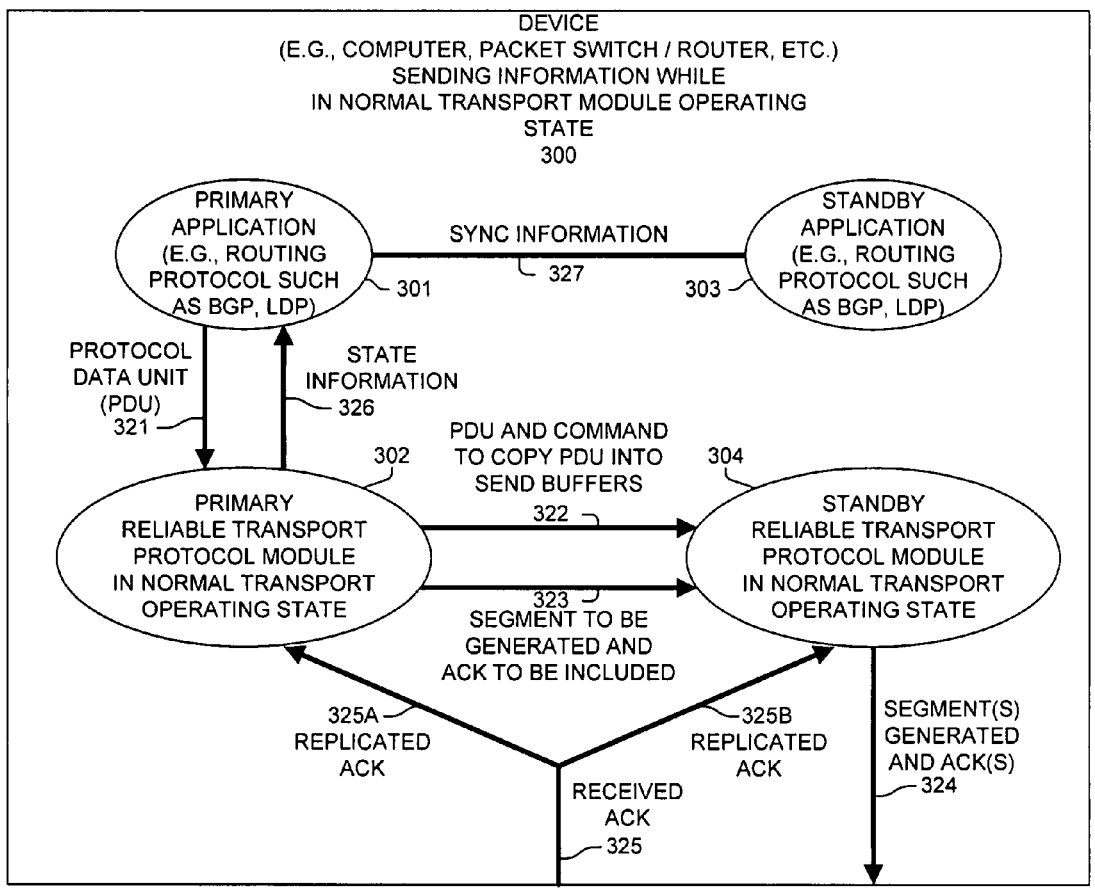

FIGS. 3A and 3B are used to illustrate the operation of one embodiment in the normal transport operating state. The primary and standby reliable transport protocol modules each maintain state concerning the reliable transport connection (e.g., data, segmentation, acknowledgements) such that if the primary or standby reliable transport protocol module fails, the other can resume by itself such that the communication with the peer transport application does not need to be restarted. Also, by the communications subsystem of a device providing copies of received reliable transport protocol messages directly to both the primary and standby reliable transport protocol modules, upon failover, the communications subsystem does not need to be reconfigured for resuming operations as, for example, the standby reliable transport protocol module will already be receiving these packets.

Before expressly turning to these figures, one embodiment performs according to the following two general rules.

1. Received data should not be acknowledged to the peer until both primary and standby reliable transport protocol modules have that data in their buffers. Else, if a failover occurs, the standby reliable transport protocol module stack may lose data as it does not have the state information to request retransmission of the data from the peer as it would have already been acknowledged by the primary reliable transport protocol module. Nor can it be guaranteed to get this data from the primary reliable transport protocol module because the failover might have occurred because of, or result in, a failure of the primary reliable transport protocol module.

2. Outgoing data should be first replicated from the primary reliable transport protocol module to the standby reliable transport protocol module before it is sent to the peer. Else, if failover happens and the peer asks for retransmission of some data (e.g., due to lost packets in transit), then the standby reliable transport protocol module being the active reliable transport protocol module in the failover transport module operating state will not be able to retransmit either the actual data.

FIGS. 3A and 3B illustrate device 300 operating in the transport module operating state for communicating with a peer external to device 300 according to one embodiment. In the normal transport module operating state, primary reliable transport protocol module 302 is the acting reliable transport protocol module, while standby reliable transport protocol module 304 is mirroring the state of the acting reliable transport protocol module so it can takeover upon failover or switching to standby reliable transport protocol module 304.

Initially, in response to primary application 301, primary reliable transport protocol module 302 establishes a reliable transport connection with an external peer transport application, and over which, primary application 301 can communicate with an external peer application. Then primary application 301 and standby application 303 are synchronized, and primary reliable transport protocol module 302 and standby reliable transport protocol module 304 are synchronized. Once the sessions are synchronized, the steady-state stage comes into play, during which: incoming packets are replicated and delivered to both primary reliable transport protocol module 302 and standby reliable transport protocol module 304; and the standby reliable transport protocol module 304 mirrors primary reliable transport protocol module 302 so that if a failover occurs, standby reliable transport protocol module 304 can take over as the active reliable transport protocol module. Similarly, standby application 303 mirrors primary application 301 so it can take over if failover occurs.

In response to receiving (311) an ingress reliable transport protocol packet from a peer external to device 300, copies of the received packet are delivered to primary reliable transport protocol module 302 (311A) and standby transport protocol module 304 (311B). For example, in one embodiment operating in a router, the local packet transport service (e.g., the internal packet switching/routing functionality) can be used in performing this duplication and delivery function.

In response to receiving copy of the received packet, standby transport protocol module 304 updates its state information and informs (313) primary reliable transport protocol module 302 that it has received and/or processed its copy of the receive packet. There are numerous formats of messages or signals that can be used to inform (313) primary reliable transport protocol module 302. In one embodiment, if there is an error in this internal messaging (313), primary reliable transport protocol module 302 will not acknowledge (314) the corresponding data, and therefore, the external peer transport application will retransmit the data.

Standby transport protocol module 304 also provides (314) data from the received packet to standby application 303 so that it can update its application state.

In response to receiving its copy of the received packet and the informing (313) by standby transport protocol module 304, primary reliable transport protocol module 302 causes (314) an acknowledgment to be sent to the external peer and provides (315) the received data to primary application 301 so that it can update its application state. Note, line 314 is shown as dashed as the acknowledgments may be sent directly to the peer in one embodiment, or sent through standby reliable transport protocol module 304 such as in one embodiment illustrated in FIG. 3B, to which we now turn.

When primary application has data to send to its peer, primary application 301 provides a protocol data unit (PDU) 321 (e.g., data to be sent to the external peer) to primary reliable transport protocol module 302. Primary reliable transport protocol module 302 commands (322) standby reliable transport protocol module 304 to make a copy of the PDU into its send buffers. Primary reliable transport protocol module 302 determines how to segment this PDU and communicates (323) another command to standby reliable transport protocol module 304 telling it how the segments should be generated as well as what acknowledgements (e.g., for packets received from the external peer) should be sent to the external peer. In one embodiment, if there is an error in this internal messaging (322 and/or 323), standby reliable transport protocol module 304 will not send (324) the corresponding data/segments, and therefore, the external peer transport application will not acknowledge this segmented data (as it never received it), and primary reliable transport protocol module 302 will communicate (322, 323) this data and corresponding segmentation instructions to standby reliable transport protocol module 304 in due course.

In response to successful communications 322 and 323, standby reliable transport protocol module 304 sends (324) the segment(s) generated with the appropriate acknowledgments. Copies are provided (325A, 325B) of a received (325) acknowledgment from the peer are delivered to primary reliable transport protocol module 302 and standby reliable transport protocol module 304. In response, primary reliable transport protocol module 302 updates (326) primary application 301 with information regarding data sent by primary application 301 and for which acknowledgments were received (325). Additionally, primary application 301 periodically synchronizes with standby application 303 so that standby application will have the appropriate state to take over in case of failover.

Figure 4A:
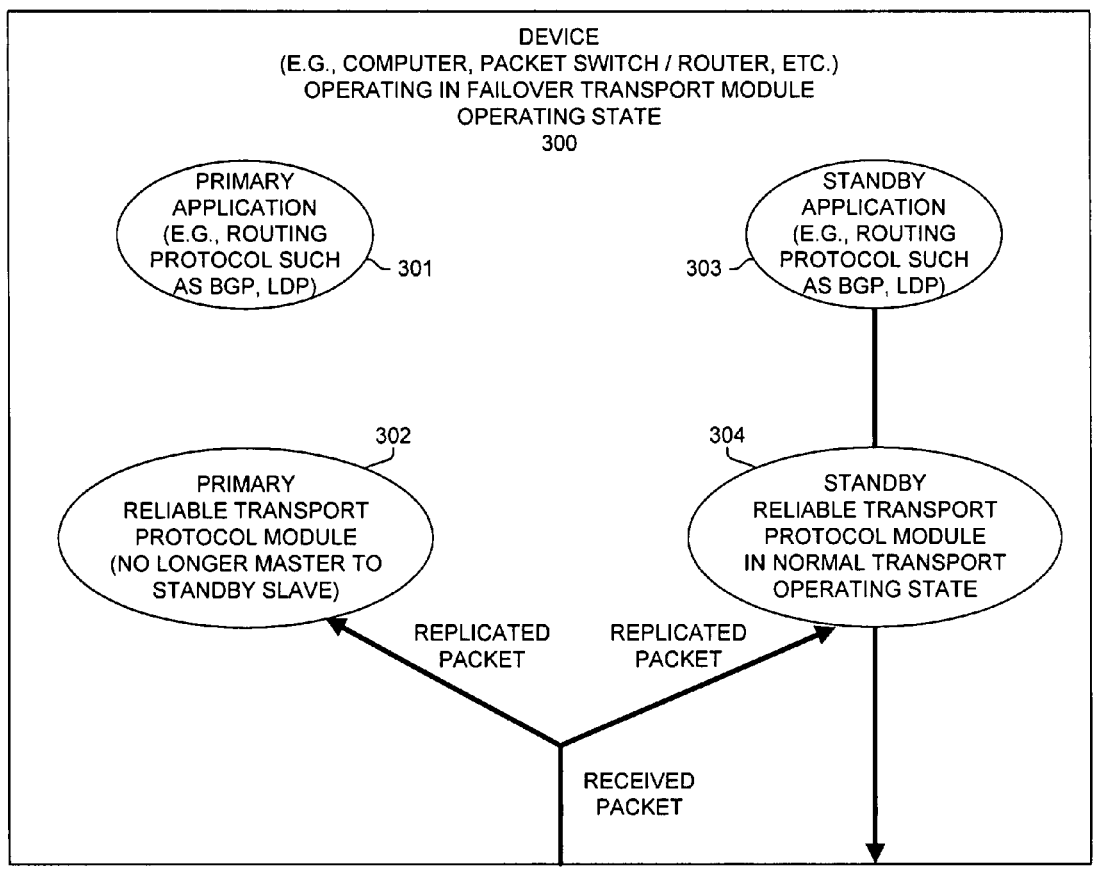
FIG. 4A illustrates the operation of one embodiment operating in failover transport module operating state.

FIG. 4A illustrates device 300 operating in failover transport module operating state. By maintaining state as described in FIGS. 3A and 3B, one embodiment allows standby reliable transport protocol module 304 (and standby application 303) to have the appropriate state to maintain the reliable transport connection with the remote peer, and continue with minimal or no retransmissions of data or packets being required. In addition, by the communications subsystem of device 300 providing copies of received reliable transport protocol packets to both primary reliable transport protocol module 302 and standby reliable transport protocol module 304 in the normal operating mode, upon failover, this communications subsystem does not have to be reconfigured upon failover to send these packets to standby reliable transport protocol module 304 so that it can take over as the active reliable transport protocol module—as the communications subsystem is already configured to provided these packets. After failover, the communications subsystem can be reconfigured to provide these only to standby reliable transport protocol module 304, or remain as configured as typically primary reliable transport protocol module 302 will return to service after some duration.

Figure 4B:
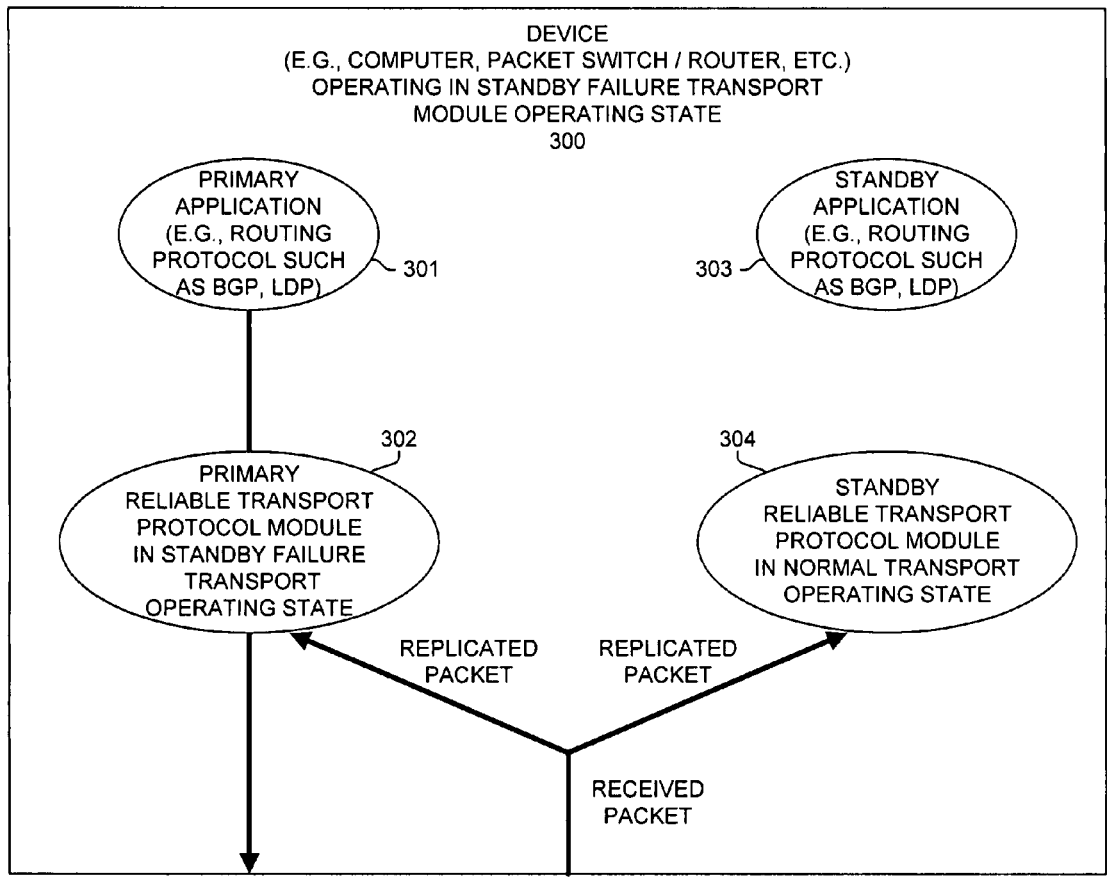
FIG. 4B illustrates the operation of one embodiment operating in standby failure transport module operating state.

FIG. 4B illustrates device 300 operating in standby failure transport module operating state. By operating as described in FIGS. 3A and 3B, one embodiment allows primary reliable transport protocol module 302 (and primary application 301) to have the appropriate state to continue as the active reliable transport protocol module and to maintain the reliable transport connection with the remote peer, and to continue with minimal or no retransmissions of data or packet being required. Again, by the communications subsystem of device 300 providing copies of received reliable transport protocol packets to both primary reliable transport protocol module 302 and standby reliable transport protocol module 304 in the normal operating mode, upon failure of standby reliable transport protocol module 304, primary reliable transport protocol module 302 can immediately continue without reconfiguration of the communications subsystem as its is already configured to provided these packets to primary reliable transport protocol module 302. After such failure, the communications subsystem can be reconfigured to provide these only to primary reliable transport protocol module 302, or remain as configured as typically standby reliable transport protocol module 304 will return to service after some duration.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   a primary reliable transport protocol module configured: (a) to be the active reliable transport protocol module in a normal transport module operating state, and (b) not to be the active reliable transport protocol module in a failover transport module operating state;
   a standby reliable transport protocol module configured: (a) not to be the active reliable transport protocol module in the normal transport module operating state, and (b) to be the active reliable transport protocol module in the failover transport module operating state; and a communications subsystem, communicatively coupled to the primary reliable transport protocol module and the standby reliable transport protocol module, configured to communicate packets with one or more external devices, including delivering individual copies of reliable transport protocol module packets received over a connection with a peer transport application in one of said external devices to both the primary and standby reliable transport protocol modules while in the normal transport module operating state, wherein said individual copies of said received reliable transport protocol module packets being delivered to the primary reliable transport protocol module do not flow through the standby reliable transport module, and wherein said individual copies of received reliable transport protocol module packets being delivered to the standby reliable transport protocol module do not flow through the primary reliable transport module;

wherein the connection with the peer transport application does not need to be restarted when a switch is made from the normal transport module operating state to the failover transport module operating state and the standby reliable transport protocol module takes over as the active reliable transport protocol module from the primary reliable transport module;

wherein the standby reliable transport protocol module is configured to, in response to receiving one of said individual copies of a particular packet of said received reliable transport protocol module packets, (a) communicate an indication of said receipt by the standby reliable transport protocol module to the primary reliable transport protocol module, and (b) provide information from said copy of the particular packet to a standby application; and wherein the primary reliable transport protocol module is configured to, in response to receiving the indication of said receipt by the standby reliable transport protocol module and having received one of said individual copies of the particular packet: (a) sending an acknowledgement message corresponding to the particular packet to the peer transport application via the standby reliable transport protocol module, and (b) providing information from said copy of the particular packet to a primary application.

2. The apparatus of claim 1, wherein the communications subsystem is configured to maintain the same routing of the reliable transport protocol module packets by the communications subsystem to both the primary and standby reliable transport modules when the apparatus is in the normal transport module operating state and in the failover transport module operating state.

3. The apparatus of claim 1, wherein the communications subsystem is configured to continue to deliver individual copies of received reliable transport protocol module packets to both the primary and standby reliable transport protocol modules at least until the standby reliable transport protocol module acts as the active reliable transport protocol module in switching from the normal transport module operating state to failover transport module operating state.

4. The apparatus of claim 1, wherein while in the normal transport module operating state, the primary reliable transport protocol module communicates information to be sent to the peer transport application to the standby reliable transport module, and in response, the standby reliable transport protocol module sends this said information to the peer transport application.

5. The apparatus of claim 4, wherein the primary reliable transport protocol module is configured to provide data segmenting instructions to the standby reliable transport protocol module for information being sent to the peer transport application; and the standby reliable transport protocol module is configured to send said information to the peer transport application according to said provided data segmenting instructions.

6. The apparatus of claim 1, comprising: a primary application and secondary application; wherein the apparatus is configured to communicate information between the primary application and the peer transport application using the primary reliable transport protocol module in the normal transport module operating state and between the secondary application and the peer transport application using the standby reliable transport protocol module in the failover transport module operating state.

7. The apparatus of claim 6, wherein said reliable transport protocol module packets are transmission control protocol (TCP) packets.

8. The apparatus of claim 7, wherein the primary application, the secondary application and the peer transport application each run border gateway protocol (BGP) or Label Distribution Protocol (LDP).

9. The apparatus of claim 8, wherein the apparatus corresponds to a packet switching device.

10. The apparatus of claim 1, wherein, while in the normal transport module operating state: acknowledgements of said received reliable transport protocol module packets are generated by the primary reliable transport protocol module and provided to the standby reliable transport module, and in response, the standby reliable transport module updates its state information and sends acknowledgements to the peer transport application covering said acknowledgments generated by the primary reliable transport protocol module.

11. The apparatus of claim 1, including one or more first processors and first memory and one or more second processors and second memory; wherein the first memory stores one or more instructions that, when executed by said one or more first processors, perform steps for implementing the operations of the primary reliable transport module, and wherein the second memory stores one or more instructions that, when executed by said one or more second processors, perform steps for implementing the operations of the standby reliable transport module.

12. The apparatus of claim 1, including a first application processor card and a second application processor card; wherein the first application processor card is configured to implement the primary reliable transport module; and wherein the second application processor card is configured to implement the standby reliable transport module.

13. The apparatus of claim 12, wherein while in the normal transport module operating state, the primary reliable transport protocol module communicates information to be sent to the peer transport application to the standby reliable transport module, and in response, the standby reliable transport protocol module sends this said information to the peer transport application.

14. The apparatus of claim 13, wherein the active primary reliable transport protocol module is configured to be the active reliable transport protocol module in a standby failure transport module operating state and to communicate with the peer transport application without sending information through the standby reliable transport module.

15. A method performed by a device for communicating information with a peer transport application external to the device, the method comprising:

receiving a packet from the peer transport application;

providing individual copies of the packet to both a primary reliable transport protocol module and a standby reliable transport protocol module without routing either copy through the other said reliable transport protocol module;

in response to receiving one of said copies of the packet, the standby reliable transport protocol module: (a) communicating an indication of said receipt by the standby reliable transport protocol module to the primary reliable transport protocol module, and (b) providing information from said copy of the packet to a standby application; and in response to receiving the indication of said receipt by the standby reliable transport protocol module and having received one of said copies of the packet, the primary reliable transport protocol module: (a) sending an acknowledgement message corresponding to the packet to the peer transport application via the standby reliable transport protocol module, and (b) providing information from said copy of the packet to a primary application.

16. The method of claim 15, comprising:

in response to the primary reliable transport protocol module receiving data from the primary application to be sent to the peer transport application, the primary reliable transport protocol module providing said data and segmenting instructions to the standby reliable transport protocol module; and in response to receiving said data and said segmenting instructions, the standby reliable transport protocol module sending said data according to said segmenting instructions to the peer transport application.

17. The method of claim 16, wherein the primary reliable transport protocol module generates acknowledgements for data received from the peer transportation application and informs the standby reliable transport protocol module of said acknowledgements; and in response, the standby reliable transport protocol module communicates acknowledgements to the peer transport application covering said acknowledgements generated by the primary reliable transport protocol module.

18. The method of claim 16, comprising: in response to changing to a failover transport module operating state, the standby reliable transport protocol module takes over as the active reliable transport protocol module and communicates with the peer transport application and the standby application without being a slave to the primary reliable transport protocol module.

19. The method of claim 15, wherein the device is a packet switching device.

20. An apparatus configured to communicate information with a peer transport application external to the apparatus, the apparatus comprising:

means for providing individual copies of the packet to both a primary reliable transport protocol module and a standby reliable transport protocol module without routing either copy through the other said reliable transport protocol module;

the standby reliable transport protocol module including (a) means for communicating an indication of said receipt by the standby reliable transport protocol module to the primary reliable transport protocol module, and (b) means for providing information from said copy of the packet to a standby application; and the primary reliable transport protocol module including (a) means for sending an acknowledgement message corresponding to the packet to the peer transport application via the standby reliable transport protocol module, and (b) means for providing information from said copy of the packet to a primary application.

21. The apparatus of claim 20, wherein the standby reliable transport protocol module comprises means for acting as the active reliable transport module, which includes means for communicating with the peer transport application and the standby application without being a slave to the primary reliable transport protocol module.

22. The apparatus of claim 20, wherein the apparatus is a packet switching device.

23. An apparatus, comprising:

a primary reliable transport protocol module;

a standby reliable transport protocol module; and a communications subsystem configured to receive a packet from a peer transport application external to the apparatus, and to provide individual copies of the packet to both the primary reliable transport protocol module and the standby reliable transport protocol module without routing either copy through the other said reliable transport protocol module;

wherein the standby reliable transport protocol module is configured to, in response to receiving one of said copies of the packet, (a) communicate an indication of said receipt by the standby reliable transport protocol module to the primary reliable transport protocol module, and (b) provide information from said copy of the packet to a standby application; and wherein the primary reliable transport protocol module is configured to, in response to receiving the indication of said receipt by the standby reliable transport protocol module and having received one of said copies of the packet, (a) send an acknowledgement message corresponding to the packet to the peer transport application via the standby reliable transport protocol module, and (b) provide information from said copy of the packet to a primary application.

24. The apparatus of claim 23, wherein the apparatus is a packet switching device.

\* \* \* \* \*